(12) United States Patent
Abu-Jdayil et al.

(10) Patent No.: US 9,347,216 B2
(45) Date of Patent: May 24, 2016

(54) THERMAL INSULATION MATERIAL

(71) Applicant: United Arab Emirates University, Al-Ain (AE)

(72) Inventors: Basim Abu-Jdayil, Al-Ain (AE); Abdel Hamid I. Mourad, Al-Ain (AE)

(73) Assignee: United Arab Emirates University, Al-Ain (AE)

( * ) Notice: Subject to any disclaimer, the term of this patent is extended or adjusted under 35 U.S.C. 154(b) by 26 days.

(21) Appl. No.: 14/086,706

(22) Filed: Nov. 21, 2013

(65) Prior Publication Data

US 2015/0137023 A1 May 21, 2015

(51) Int. Cl.
*C08K 11/00* (2006.01)
*E04B 1/76* (2006.01)
*E04B 1/74* (2006.01)

(52) U.S. Cl.
CPC ............... *E04B 1/76* (2013.01); *C08K 11/005* (2013.01); *E04B 2001/745* (2013.01)

(58) Field of Classification Search
CPC .... E01B 1/76; E01B 2001/745; C08K 11/005
See application file for complete search history.

(56) References Cited

U.S. PATENT DOCUMENTS

| | | | |
|---|---|---|---|
| 2013/0089738 A1 | 4/2013 | Al-Zahrani et al. | |
| 2013/0096238 A1* | 4/2013 | Alsewailem et al. | 524/15 |

FOREIGN PATENT DOCUMENTS

EP 292628 * 11/1988

OTHER PUBLICATIONS

Chemical Abstract citation 2013:1366307; Mittal et al, "Biopolymer-date seed powder composites: Miscibility, morphology, and component migration", Abstracts of Papaers, 246th ACS National Meeting & Exposition, Indianapolis, IN, US, Sep. 8-12, 2013.*
Abu-Jdayil, Basim, et al., "Jordanian Clay-Based Heat Insulator Composites: Mechanical Properties." Journal of Reinforced Plastics and Composites, vol. 27, No. 14, 2008, pp. 1559-1568.
Abu-Jdayil, Basim, et al., "Study on Bentonite-Unsaturated Polyester Composite Materials." Journal of Reinforced Plastics and Composites, vol. 21, No. 17, 2002, pp. 1597-1607.
Agoudjil, Boudjemaa, et al., "Renewable Materials to Reduce Building Heat Loss: Characterization of Date Palm Wood." Energy and Buildings, vol. 43, 2011, pp. 491-497.
Al-Ghouti, Mohammad, et al., "Adsorption Mechanisms of Removing Heavy Metals and Dyes From Aqueous Solution Using Date Pits Solid Adsorbent." Journal of Hazardous Materials, vol. 176, 2010, pp. 510-520.
Al-Homoud, M. S., "Performance Characteristics and Practical Applications of Common Building Thermal Insulation Materials." Building and Environment, vol. 40, 2005, pp. 353-366.
Al-Malah, Kamal, et al., "Clay-Based Heat Insulator Composites: Thermal and Water Retention Properties." Applied Clay Science, vol. 37, 2007, pp. 90-96.
Al-Muhtaseb, Shaheen A., et al., "Removal of Aluminum From Aqueous Solutions by Adsorption on Date-Pit and BDH Activated Carbons." Journal of Hazardous Materials, vol. 158, 2008, pp. 300-307.
Banat, Fawzi, et al., "Evaluation of the Use of Raw and Activated Date Pits as Potential Adsorbents for Dye Containing Waters." Process Biochemistry, vol. 39, 2003, pp. 193-202.
Cabeza, L. F., et al, "Experimental Study on the Performance of Insulation Materials in Mediterranean Construction." Energy and Buildings, vol. 42, 2010, pp. 630-636.
El-Kassas, A.M., et al., "Novel Fibers Preparation Technique for Manufacturing of Rice Straw Based Fiberboards and Their Characterization." Materials & Design, vol. 50, 2013, pp. 757-765.
El-Naas, Muftah H., et al., "Removal of Phenol From Petroleum Refinery Wastewater Through Adsorption on Date-Pit Activated Carbon." Chemical Engineering Journal, vol. 162, 2010, pp. 997-1005.
Fornasieri, Marcia, et al., "Synthesis and Characterization of Polyurethane Composites of Wood Waste and Polyols From Chemically Recycled Pet." Composites: Part A, vol. 42, 2011, pp. 189-195.
Goncalves, M.R.F., et al., "Thermal Insulators Made With Rice Husk Ashes: Production and Correlation Between Properties and Microstructure." Construction and Building Materials, vol. 21, 2007, pp. 2059-2065.
Ismail, M. R., et al., "Studies on Sand/Clay Unsaturated Polyester Composite Materials." Journal of Applied Polymer Science, vol. 72, 1999, pp. 1031-1038.
Kazim, Ayoub M., "Assessments of Primary Energy Consumption and Its Environmental Consequences in the United Arab Emirates." Renewable and Sustainable Energy Reviews, vol. 11, 2007, pp. 426-446.
Kumar, Sunil, "Fly Ash-Lime-Phosphogypsum Hollow Blocks for Walls and Partitions." Building and Environment, vol. 38, 2003, pp. 291-295.
Lee, J. Y., et al., "Characterization of Organobentonite Used for Polymer Nanocomposites." Materials Chemistry and Physics, vol. 85, 2004, pp. 410-415.
Liu, Qinfu, et al., "Properties of Vulcanized Rubber Nanocomposites Filled With Nanokaolin and Precipitated Silica." Applied Clay Science, vol. 42, 2008, pp. 232-237.
Mourad, Abdel-Hamid I., "Thermo-Mechanical Characteristics of Thermally Aged Polyethylene/Polypropylene Blends." Materials and Design, vol. 31, 2010, pp. 918-929.
Mourad, Abdel-Hamid I., et al., "Characterisation of Thermally Treated and Untreated Polyethylene-Polypropylene Blends Using DSC, TGA and IR Techniques." Plastics, Rubber and Composites: Macromolecular Engineering, vol. 38, No. 7, 2009, pp. 265-278.
Pelisser, Fernando, et al., "Concrete Made With Recycled Tire Rubber: Effect of Alkaline Activation and Silica Fume Addition." Journal of Cleaner Production, vol. 19, 2011, pp. 757-763.

(Continued)

*Primary Examiner* — Carol M Koslow
(74) *Attorney, Agent, or Firm* — Fitch, Even, Tabin & Flannery LLP

(57) ABSTRACT

The present invention relates to a thermal insulation material comprising date pits and polyester resin.

20 Claims, 2 Drawing Sheets

(56) References Cited

OTHER PUBLICATIONS

Qin, Lijun, et al., "Mechanical and Thermal Properties of Poly(lactic acid) Composites with Rice Straw Fiber Modified by Poly(butyl acrylate)." Chemical Engineering Journal, vol. 166, 2011, pp. 772-778.

Singh, Manjit, et al., "Phosphogypsum—Fly Ash Cementitious Binder—Its Hydration and Strength Development." Cement Concrete Research, vol. 25, No. 4, 1995, pp. 752-758.

Mukheijee, Tapasi, et al., "PLA Based Biopolymer Reinforced with Natural Fibre: A Review." Journal of Polymer Environment, 2011, vol. 19, pp. 714-725.

Abdal-hay, Abdalla, et al., "Study on Water Absorption and Impact Properties of Vegetal Composites Material: Composite Structures" Advanced Materials Research, 2012, vol. 530, pp. 34-39.

Alsewailem, Fares D., et al., "Preparation and Characterization of Polymer/Date Pits Composites." Journal of Reinforced Plastics and Composites, 2009, pp. 1-7.

Hamma, Amel, et al., "Polypropylene/Date Stone Flour Composites: Effects of Filler Contents and EBAGMA Compatibilizer on Morphology, Thermal, and Mechanical Properties." Journal of Applied Polymer Science, 2013, pp. 4314-4321.

Mukherjee, Tapasi, et al., "PLA Based Biopolymer Reinforced with Natural Fibre: A Review." Journal of Polymer Environment, 2011, vol. 19, pp. 714-725.

International Search Report, International Patent Application No. PCT/IB2014/066196, Mar. 13, 2015, 4 pages.

Written Opinion of the International Searching Authority, International Patent Application No. PCT/IB2014/066196, Mar. 13, 2015, 9 pages.

Strong, A. Brent, Fundamentals of Composites Manufacturing: Materials, Method, and Applications. Society of Manufacturing Engineers, Second Edition, 2008, pp. 47-83.

* cited by examiner

THERMAL INSULATION MATERIAL

FIELD OF INVENTION

The present invention relates to a thermal insulation material comprising date pits and polyester resin.

BACKGROUND

On average, space heating and cooling accounts for 50-70% of the energy use of a US home (Al-Homoud, 2005). This percentage could be higher in other parts of the world with harsher climatic conditions and less energy efficient buildings, for example in the Gulf region. Thermal insulators, as part of building materials and some industrial hardware, are therefore steadily gaining importance as a means of saving energy.

Thermal insulation serves in reducing energy losses during the whole year by maximizing the efficiency of both cooling and heating systems. Savings in energy consumption will reduce both costs and carbon emissions.

Thermal insulation materials available in the Gulf region are relatively expensive and until now are infrequently used by local contractors. In addition, the typical insulation materials; polyurethane, polystyrene, and mineral wool (Cabeza et al., 2010) suffer from poor mechanical properties, which limit their application in the construction process. Consequently, there is a necessity to develop a thermal insulation material that possesses excellent mechanical and physical properties as far as energy saving, water resistance, ease of handling and machining are concerned. At the same time, it should be relatively cheap so that it may be used extensively.

Many presently available insulating materials are made of polymer materials, fillers, and other additives, i.e. they are composite materials. Polymers are generally known to be good insulating materials due to their stable physical and chemical properties. Mechanical properties, however, can be further improved or modified with the addition of fillers as demonstrated by the increase in the strength of the composite (Liu et al., 2008). Many kinds of clay minerals such as bentonite, kaolin, talc, mica, etc. have been used as inorganic fillers for the conventional polymer composites to reduce the cost or to give them special properties such as modulus, hardness, thermal stability, electrical insulation, thickening, opacity and brightness (Ismail et al., 1999; Abu-Jdayil et al., 2002; Lee and Lee, 2004; Al-Malah and Abu-Jdayil, 2007; Abu-Jdayil and Al-Malah, 2008).

Mixtures of fly ash, lime and phophogypsum known as fly ash-lime-phosphogypsum cements were used in the application and manufacturing of building materials such as bricks and structural concretes (Singh and Garg, 1995; Kumar, 2003). Goncalves and Bergmann (2007) have utilized the rice husk ashes to produce thermal insulators. They found that the thermal conductivity of the rice husk ash insulators is low (between 0.15 and 0.28 watts per meter kelvin difference (W/mK)), but higher than a commercial thermal insulator made from diatomaceous silica, used as reference. Agoudjil et al. (2011) reported the results of an experimental investigation on the thermophysical, chemical and dielectric properties of three varieties of date palm wood to be used in thermal insulation for buildings. Polyurethane/wood-based composites were synthesized with wood waste from furniture companies and polyols obtained from chemically recycled poly(ethylene terephthalate) (PET) and commercial polyols (Fornasieri et al., 2011). Although the Young's modulus and tensile strength of the composites have been improved, no significant improvement in the thermal stability of the composites was observed. Recently, Qin et al. (2011) have investigated the mechanical and thermal properties of poly (lactic acid) composites with rice straw fiber modified by poly (butyl acrylate) to be used in different applications. However, values for thermal conductivity were not reported. Mourad et al. (2009, 2010, 2013) have studied the mechanical, thermal and chemical properties of different polymer composite materials and very recently they (2013) have developed a novel technique to produce rice straw-based fiberboards and characterized their physico mechanical properties.

Date pits are readily available in a number of countries. Date pits have typically been seen as waste product from the preparation of dates and are usually discarded. In the United States, pulverised ground date pits are being used on a small scale, on dirt roads as a type of road base gravel. In the Middle East, it is sometimes used in animal feed (Banat et al., 2003). Several investigators have used date-pits to adsorb dye (Banat et al., 2003), aluminum (Al-Muhtaseb et al., 2008), heavy metals (Al-Ghouti et al., 2010), and phenol (El-Naas et al., 2010).

SUMMARY OF INVENTION

In a first aspect the present invention provides a composition comprising:
a. date pits; and
polyester resin.

Preferably, the composition comprises from 10% to 70% date pits by weight. More preferably, the composition comprises 60% date pits by weight.

Preferably, the date pits are ground date pits. More preferably, the ground date pits have a particle size of less than about 800 μm.

In another aspect, the present invention provides a thermal insulator material formed from the composition of the first aspect. In yet another aspect, the present invention provides a building block formed from the composition of the first aspect.

In a further aspect, the present invention provides a process for preparing a thermal insulator material, the process comprising:
a. mixing ground date pits with polyester resin;
b. adding an initiator compound to the mixture obtained in step (a); and
c. allowing the mixture to cure to form a thermal insulator material.

DETAILED DESCRIPTION

Figure 1:
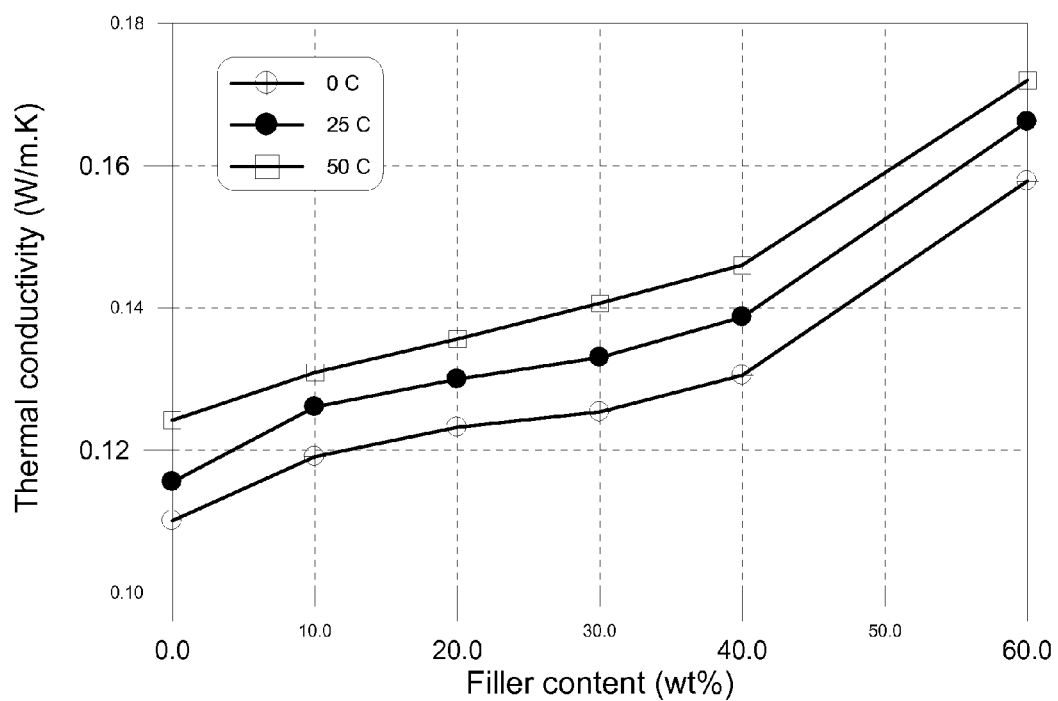
FIG. 1 shows the thermal conductivity coefficient of composite material as a function of filler content for different temperatures.

The present invention provides a composition comprising date pits and polyester resin.

As used herein, the term "date pit" refers to the seed portion of the fruit of the date plant, including but not limited to *Phoenix dactylifera*, which is sometimes referred to as the date palm. Date pits, which are readily available in a number of countries, have typically been seen as waste product from the preparation of dates and are usually discarded. The present invention makes use of date pits as the filler component in a composite material. The composite material finds particular utility as a thermal insulator.

Date pits from any cultivar of date may be used in the current invention. In preferred embodiments, the date pits are crushed and ground before use. The date pits may be crushed using any suitable method available in the art, including but not limited to the use of jaw crushers, gyratory crushers, cone crushers, compound crushers, horizontal shaft impactors, vertical shaft impactors (shoe and anvil), vertical shaft impactors (autogenous) or mineral sizers. The date pits may be ground using any suitable method available in the art, including but not limited to the use of a ball mill, rod mill, autogenous mill, semi-autogenous (SAG) mill, pebble mill, high pressure grinding rolls, buhrstone mill, vertical shaft impactor (VSI) mill or tower mill. Preferably, the date pits are ground such that they have a particle size of less than about 800 µm.

The level of date pit in the composite material may be varied in order to modify the properties of the material as required. Typically, the composite material will comprise from around 10% w/w to around 70% w/w date pits. In preferred embodiments, the composite material comprises 10, 20, 30, 40, 50, 60 or 70% w/w date pits. In a particularly preferred embodiment, the composite material will comprise 60% w/w date pits.

The polyester resins used in the present invention may be include but are not limited to polyethylene terephthalate (PET), polyethylene terephthalate glycol-modified (PETG), polybutylene terephthalate (PBT), polycyclohexylenedimethylene terephthalate (PCT), polytrimethylene terephthalate (PTT), polyethylene isophthalate (PEI) or copolymers thereof. Preferably, the polyester resin used is PEI or a copolymer thereof. Polyester resins may be modified by the inclusion of copolymers, in which varying amounts of different subunits are mixed in order to achieve desirable properties. Such compounds are commercially available from a number of suppliers.

Polyester resins are initially liquid and are converted into solid form by cross-linking of polymer chains. This is typically achieved by the use of an initiator compound that easily decomposes into free radicals, which starts a chain reaction of cross-linking events. Suitable initiator compounds include but are not limited to organic peroxides such as benzoyl peroxide and methyl ethyl ketone peroxide. The solidification process is often referred to as curing.

In another aspect, the present invention provides a thermal insulator material formed from the composition of the first aspect. In preferred embodiments, the thermal insulator material is in the form of sheets, blocks, cylinders or any other desired shape. Preferably, the thermal insulator material is in the form of a sheet suitable for installation in or on the walls, roof or floor of a building.

In yet another aspect, the present invention provides a building block formed from the composition of the first aspect. The building block may be of any desired size, but will typically have similar dimensions to building blocks used in the construction industry.

The invention also provides a process for the preparation of the composite material of the invention, comprising the steps of mixing date pits with polyester resin, adding an initiator compound to the mixture and allowing the mixture to cure to form the composite material. Preferably, the mixture is formed into sheets, blocks, cylinders or any other desired shape before the curing process is carried out. In a preferred embodiment, the process of the invention includes a step of crushing and grinding the date pits. Any suitable methods of crushing and grinding may be used, such as those described herein supra.

The composite materials provided herein have advantageous mechanical and thermal properties, but are also made from readily available and cheap materials.

EXAMPLE

Composite Preparation

Polyester was chosen for use as the polymer for the formulation of the heat insulator samples. Unsaturated polyester was chosen because of its ease of handling, low water absorption values, low cost and its rapid curing with no gases evolved. The polymer used was POLYLITE® 721-800 E (an unsaturated, medium reactive isophthalic polyester resin) obtained from Raichhold Incorporated Company, Jabal Ali-Dubai. The date-pits filler was obtained from a local date factory in Al-Ain. The date-pits were crushed, ground and then screened to ensure a size range of less than 800 µm.

Different series of stainless moulds were fabricated according to ASTM standard recommendations for moulding to produce standard specimens needed for compressive, tensile and thermal conductivity tests. All moulds were fabricated by Al Safa Engineering and Contracting workshop located in Sanaiya, Al-Ain.

Composites with different filler contents (0-60 wt. %) were prepared. The composites were prepared at room temperature using a high viscosity mixer. A specified amount of date-pits was gradually added to the polyester resin under specific mixing conditions. Then for the curing process, methyl ethyl ketone peroxide was added as an initiator for the thermosetting process. The mixture was then poured in a suitable mould. The interior surface of the moulds was coated with paraffin wax to prevent sticking of the sample with the mould. Samples for compression test, tensile test, and thermal conductivity test were prepared.

Thermal Conductivity Testing

A thermal conductivity testing machine, Lasercomp FOX-200 was used to measure the thermal conductivity of the produced composites. A specific mould was fabricated according to the dimensions of the sample required by the Lasercomp heat flow instrument. The dimensions of the samples were 150 mm×150 mm×20 mm. The measurement conditions follow the standard methods reported by ASTM C1045-01. The steady state method was used in these measurements, where the thermal conductivity was determined from measurements of the temperature gradient in the composite material and the heat input.

FIG. 1 shows the thermal conductivity coefficient of composite material as a function of filler context for different temperatures. Increasing the filler content, in general, causes a slight increase in thermal conductivity coefficient. This may be due to the higher conductivity of the filler compared to the polyester resin. However, the thermal conductivity of the prepared composite material is very promising and comparable with the commercial thermal insulators.

Compared with building bricks (or cement plaster) which have thermal conductivity of 0.72 W/(m K), with concrete (stone) which has a thermal conductivity of 0.93 W/(m K), and with reinforced concrete with a thermal conductivity of 1.73 W/(m K), Polyester-date-pits composites with 60 wt % date-pits content have thermal conductivity values between 0.166 and 0.170, at 0 and 50° C., respectively. Rice husk ash insulators reported in the prior art have thermal conductivities between 0.15 and 0.28 W/mK (Goncalves and Bergmann, 2007).

If an average resistance, using Eq. (1), is taken to the aforementioned materials without incorporating the composite:

$$\frac{1}{k_{average}} = \sum_{i=1}^{n} \frac{w_i}{k_i} = \frac{0.333}{1.73} + \frac{0.333}{0.93} + \frac{0.333}{0.72} \quad (1)$$

where $k_i$ is the thermal conductivity of component i and $w_i$ is the weight fraction of component i, then a $k_{average}$ of 1.0 W/(m K) is obtained. On the other hand, if a wall is built with such building materials (building blocks, concrete and reinforced concrete) while this time the polyester-date-pits composite comprises one-third of the wall thickness while the rest of the wall is made of the previous materials, then $$\frac{1}{k_{average\ with\ insulation}} = \sum_{i=1}^{n} \frac{w_i}{k_i} = \frac{0.333}{0.168} + \frac{0.67}{1.0} = 2.634 \quad (2)$$

which means that the new value of $k_{average}$ will be 0.3796 W/(m K).

Consequently, constructing a wall made of polyester-clay composite that comprises one-third a wall thickness, the minimum percent relative reduction in overall thermal conductivity will be about 62%.

Mechanical Tests

The compressive test was conducted using universal testing machine (MTS Model MH/20 and capacity 100 kN), where the specimen was compressed between the upper and lower plates of the machine. The loading was continued up to the distance between the upper and lower plates reached a specific value and then the test were interrupted. The dimensions of the specimens used in this test were 30 mm in length and 25 mm in diameter. The average of three tests has been reported for all samples.

The tensile strength of each specimen was determined using the universal testing machine (MTS Model MH/20 and capacity 100 kN), where the specimen was stretched between the upper and lower plates of the machine until the specimen had broken. The overhead speed used in this test was 2.0 mm/min. The test specimen was held between aluminium sheets on both sides to ensure good contact area between the machine plates and the specimen and avoid slippage. The tests were performed in triplicates for each sample and average of the readings was reported.

Figure 2:
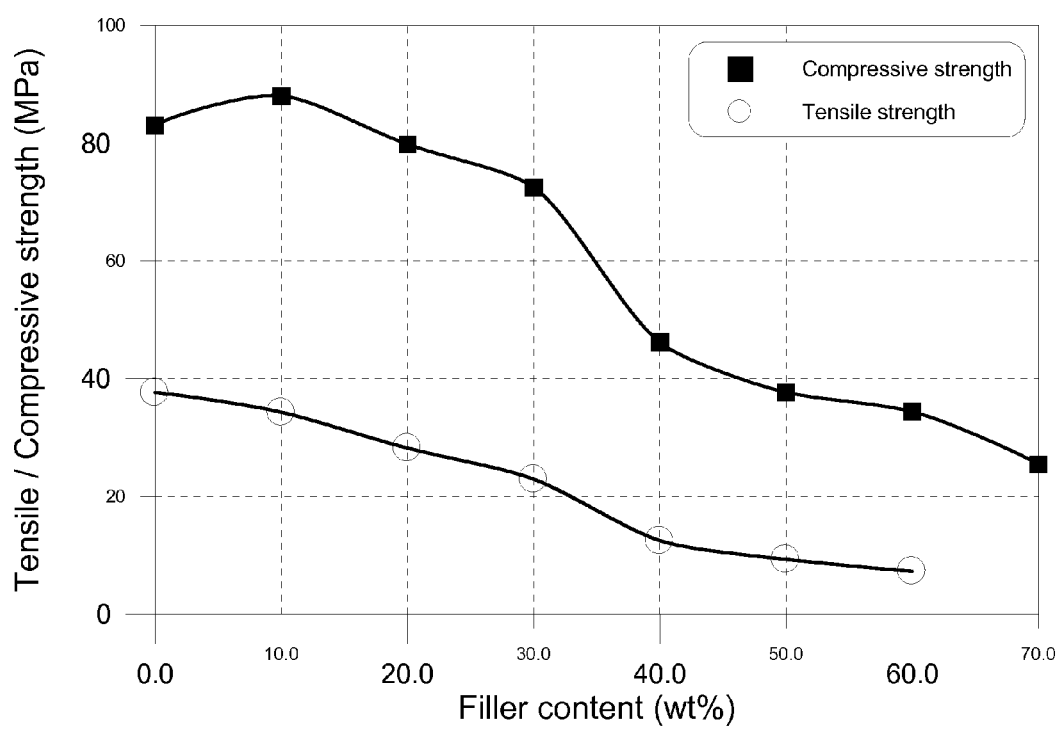
FIG. 2 shows the results of the compressive and tensile strength tests for various levels of date pit filler content.

FIG. 2 shows the results of the compressive and tensile strength tests for various levels of date pit filler content.

Preparation of a Thermal Insulation Sheet

In order to prepare a thermal insulation sheet in accordance with the invention, the date pit/polyester resin will be prepared as described above and then poured into a mould having the desired dimensions of the thermal insulation sheet. After curing, the block will be removed from the mould.

Preparation of a Building Block

In order to prepare a building block in accordance with the invention, the date pit/polyester resin will be prepared as described above and then poured into a mould having the desired dimensions of the building block. After curing, the block will be removed from the mould.

While the invention has been described in detail and with reference to specific embodiments thereof, it will be apparent to one of skill in the art that various changes and modifications can be made therein without departing from the spirit and scope thereof. Moreover, all embodiments described herein are considered to be broadly applicable and combinable with any and all other consistent embodiments, as appropriate.

Various publications are cited herein, the disclosures of which are incorporated by reference in their entireties.

REFERENCES

Abu-Jdayil, B., Al-Malah, K. 2008. *Journal of Reinforced Plastics and Composites*, 27: 1559-1568.

Abu-Jdayil, B., Al-Malah, K., Sawlaha, R. 2002. *Journal of Reinforced Plastics and Composites*, 21: 597-1607.

Agoudjil, B., Benchabane, A., Boudennec, A., Ibos, L., Fois, M. 2011. *Energy and Buildings*, 43: 491-497.

Al-Ghouti, M. A., Li, J., Salamh, Y., Al-Laqtahb, N., Walker, G., Ahmad, M. N. M. 2010. *Journal of Hazardous Materials*, 176: 510-520

Al-Homoud, M. S. (2005). *Building and Environment*, 40: 351-364.

Al-Malah, K., Abu-Jdayil, B. 2007. *Applied Clay Science*, 37: 90-96.

Al-Muhtaseb, S. A., El-Naas, M. H., Abdallah, S. 2008. *Journal of Hazardous Materials*, 158: 300-307

Banat, F., Al-Asheh, S., Al-Makhadmeh, L. 2003. *Process Biochemistry*, 39: 193-202.

Cabeza, L. F., Castell, A., Medrano, M., Martorell, I., Perez, G. Fernandez, I. 2010. *Energy and Buildings*, 42: 630-636.

El-Kassasa A M, Mourad A-H. I., *Materials & Design* 50, 757-765, 2013

El-Naas, M. H., Al-Zuhair, S., Abu Alhaija, M. 2010. *Chemical Engineering Journal*, 162: 997-1005

Fornasieri, M., Alves, J. W., Muniz, E. C., Ruvolo-Filho, A., Otaguro, H., Rubira, A. F., de Carvalho, G. M. 2011. *Composites: Part A*, 42: 189-195.

Goncalves, M. R. F., Bergmann, C. P. 2007. *Construction and Building Materials*, 21: 2059-2065.

Ismail, M. R., Ali, M. A. M., El-Milligy, A. A., Afifi, M. S. 1999. *Journal of Applied Polymer Science*, 72: 1031-1038.

Kazim, A. M. 2007. *Renewable and Sustainable Energy Reviews*, 11: 426-446.

Kumar, S. (2003). *Building and Environment*, 38: 291-295.

Lee, J. Y., Lee, H. K. 2004. *Materials Chemistry and Physics*, 85: 410-415.

Liu, Q., Zhang, Y., Xu, H. 2008. *Applied Clay Science*, 42: 232-237.

Mourad A.-H. I, *Materials and Design*, Vol. 31, pp. 918-929, 2010.

Mourad A.-H. I., R. O. Akkad, A. A. Soliman, and T. M. Madkour, *Plastics, Rubber and Composites: Macromolecular Engineering*, Vol. 38, No 7 pp. 265-278, 2009.

Pelisser, F., Zavarise, N., Longo, T. A., Bernardin, A. M. 2010. *Journal of Cleaner Production* (in press).

Qin, L., Qiu, J., Liu, M., Ding, S., Shao, L., Lü, S., Zhang, G., Zhao, Y., Fu, X. 2011. *Chemical Engineering Journal*, 166: 772-778

Singh, M., Garg, M. 1995. *Cement Concrete Research*, 25: 752-758.

The invention claimed is:

1. A composition comprising:
    a. at least about 50% by weight date pits; and
    b. polyester resin.

2. The composition of claim 1, wherein the composition comprises from 50% to 70% date pits by weight.

3. The composition of claim 1, wherein the composition comprises at least about 60% date pits by weight.

4. The composition of claim 1, wherein the date pits are ground date pits.

5. The composition of claim 4, wherein the ground date pits have a particle size of less than about 800 μm.

6. A thermal insulator material formed from the composition of claim 1.

7. The thermal insulator material of claim 6, wherein the composition comprises from 50% to 70% date pits by weight.

8. The thermal insulator material of claim 6, wherein the composition comprises at least about 60% date pits by weight.

9. The thermal insulator material of claim 6, wherein the date pits are ground date pits.

10. The thermal insulator material of claim 9, wherein the ground date pits have a particle size of less than about 800 μm.

11. A building block formed from the composition of claim 1.

12. The building block of claim 11, wherein the composition comprises from 50% to 70% date pits by weight.

13. The building block of claim 11, wherein the composition comprises at least about 60% date pits by weight.

14. The building block of claim 11, wherein the date pits are ground date pits.

15. The building block of claim 14, wherein the ground date pits have a particle size of less than about 800 μm.

16. A process for preparing a thermal insulator material, the process comprising:
   a. mixing ground date pits with polyester resin to provide a mixture with at least 50% by weight date pits;
   b. adding an initiator compound to the mixture obtained in step (a); and
   c. allowing the mixture to cure to form a thermal insulator material.

17. The process according to claim 16, wherein the polyester resin comprises a thermoset unsaturated polyester resin.

18. A composition comprising:
   a. at least about 50% by weight date pits; and
   b. thermoset unsaturated polyester resin.

19. The composition of claim 18, wherein the composition comprises from 50% to 70% date pits by weight.

20. The composition of claim 18, wherein the composition comprises at least about 60% date pits by weight.

* * * * *